United States Patent
Suh

(10) Patent No.: US 12,305,975 B2
(45) Date of Patent: May 20, 2025

(54) THREE-DIMENSIONAL SCANNING SYSTEM AND METHOD FOR CONTROLLING THE SAME

(71) Applicant: MEDIT CORP., Seoul (KR)

(72) Inventor: Beom Sik Suh, Seoul (KR)

(73) Assignee: MEDIT CORP., Seoul (KR)

( * ) Notice: Subject to any disclaimer, the term of this patent is extended or adjusted under 35 U.S.C. 154(b) by 397 days.

(21) Appl. No.: 17/719,373

(22) Filed: Apr. 13, 2022

(65) Prior Publication Data
US 2022/0333917 A1    Oct. 20, 2022

(30) Foreign Application Priority Data

Apr. 14, 2021  (KR) .................. 10-2021-0048727
Mar. 14, 2022  (KR) .................. 10-2022-0031163

(51) Int. Cl.
G01B 11/25    (2006.01)
A61C 9/00    (2006.01)
G06T 17/30    (2006.01)

(52) U.S. Cl.
CPC .......... *G01B 11/2518* (2013.01); *G06T 17/30* (2013.01); *A61C 9/006* (2013.01)

(58) Field of Classification Search
CPC ....... G01B 11/2518; G06T 17/30; G06T 7/70; G06T 7/80; G06T 7/0012; G06T 2207/30036; G06T 2219/2004; A61C 9/006; A61C 9/0053; A61C 9/0046; A61B 1/24; G16H 30/00
See application file for complete search history.

(56) References Cited

U.S. PATENT DOCUMENTS

| | | | | |
|---|---|---|---|---|
| 5,497,776 A | * | 3/1996 | Yamazaki | G01S 15/894 600/463 |
| 7,613,492 B2 | * | 11/2009 | Altman | A61B 6/0487 600/407 |
| 8,035,637 B2 | * | 10/2011 | Kriveshko | G06T 15/00 345/419 |
| 8,454,365 B2 | | 6/2013 | Boerjes et al. | |
| 8,758,256 B2 | * | 6/2014 | O'Laughlin | A61B 8/4254 600/463 |
| 10,019,839 B2 | | 7/2018 | Kohler et al. | |
| 10,064,553 B2 | * | 9/2018 | Fisker | A61B 5/0062 |

(Continued)

FOREIGN PATENT DOCUMENTS

| | | |
|---|---|---|
| CN | 107106271 A | 8/2017 |
| CN | 109313821 A | 2/2019 |

(Continued)

OTHER PUBLICATIONS

Extended search report mailed Aug. 9, 2022 for European Application No. 22168079.6.

(Continued)

*Primary Examiner* — Wesley J Tucker
(74) *Attorney, Agent, or Firm* — Insight Law Group, PLLC; Seung Lee

(57) ABSTRACT

A method for controlling a three-dimensional scanning system includes scanning a target by using a three-dimensional scanner and acquiring a distance between the three-dimensional scanner and the target, and switching an activation state of at least one actuator on the basis of the distance.

15 Claims, 13 Drawing Sheets

(56) References Cited

U.S. PATENT DOCUMENTS

| | | | |
|---|---|---|---|
| 10,267,627 B2* | 4/2019 | Du | G01B 11/25 |
| 10,278,584 B2* | 5/2019 | Glinec | A61B 1/00055 |
| 11,614,319 B2* | 3/2023 | Döring | G06F 3/0481 |
| | | | 715/772 |
| 11,688,018 B2* | 6/2023 | Summers | G06V 20/653 |
| | | | 345/36 |
| 2002/0015934 A1* | 2/2002 | Rubbert | A61C 3/00 |
| | | | 433/29 |
| 2007/0172112 A1* | 7/2007 | Paley | G06K 9/00 |
| | | | 382/128 |
| 2009/0298017 A1* | 12/2009 | Boerjes | A61C 9/00 |
| | | | 433/214 |
| 2012/0141949 A1* | 6/2012 | Bodony | G01B 11/25 |
| | | | 600/407 |
| 2013/0261433 A1* | 10/2013 | Daon | A61B 19/00 |
| 2013/0329120 A1* | 12/2013 | Hiasa | H04N 5/232 |
| 2017/0251143 A1* | 8/2017 | Peruch | H04N 13/257 |
| 2017/0345209 A1* | 11/2017 | Simari | G06T 17/00 |
| 2018/0005433 A1* | 1/2018 | Kohler | G06T 17/00 |
| 2018/0054562 A1* | 2/2018 | Li | H04N 5/232 |
| 2018/0085002 A1* | 3/2018 | Glinec | A61B 5/00 |
| 2018/0360567 A1* | 12/2018 | Xue | A61C 7/08 |
| 2018/0360657 A1* | 12/2018 | Bor | G02B 27/1086 |
| 2019/0162528 A1* | 5/2019 | Kjaer | H04N 1/04 |
| 2019/0353681 A1* | 11/2019 | Sadeghian Marnani | |
| | | | G01Q 80/00 |
| 2020/0318946 A1* | 10/2020 | Wolke | G01J 4/04 |

FOREIGN PATENT DOCUMENTS

| | | | | |
|---|---|---|---|---|
| CN | 109475394 A | | 3/2019 | |
| JP | 6814062 B2 * | | 1/2021 | A61B 3/10 |
| KR | 10-2020-0099999 A | | 8/2020 | |

OTHER PUBLICATIONS

Non-final Office Action mailed Dec. 21, 2023 from the Korean Patent Office for Korean Application No. 10-2022-0031163.

Non-final Office Action mailed Jan. 5, 2024 from the Chinese Patent Office for Chinese Application No. 202210392793.0.

* cited by examiner

THREE-DIMENSIONAL SCANNING SYSTEM AND METHOD FOR CONTROLLING THE SAME

CROSS-REFERENCE TO RELATED APPLICATIONS

The present application claims priority from and benefit of Korean Patent Application Nos. 10-2021-0048727 filed on Apr. 14, 2021, and 10-2022-0031163 filed on Mar. 14, 2022, the disclosures of which are incorporated by reference herein in their entirety.

BACKGROUND

1. Technical Field

The present disclosure relates to a three-dimensional scanning system and a method for controlling the same.

2. Related Art

A three-dimensional scanning technology is being used in various industrial fields such as measurement, inspection, reverse engineering, content creation, CAD/CAM for dental treatment, and medical devices, and its practicality is further expanding due to the improvement of scanning performance according to the development of a computing technology. Particularly, in the dental treatment field, the three-dimensional scanning technology is performed for patient treatment. Therefore, a three-dimensional model acquired through three-dimensional scanning is required to have high precision.

In a process of generating a three-dimensional model through a three-dimensional scanner, the three-dimensional scanner acquires entire three-dimensional model data by converting (two-dimensional or three-dimensional) image data acquired by capturing an image of a measurement target into a three-dimensional model. Furthermore, as the image of the target is closely captured, an image acquired by the three-dimensional scanner increases, resulting in the improvement of the reliability of final data for a three-dimensional model converted in realtime.

On the other hand, image data acquired by the three-dimensional scanner may be mutually aligned. Through the alignment process between the image data, three-dimensional model data precisely representing the target may be acquired.

However, when the alignment between the image data fails, a data gap may occur between image data acquired before and after the alignment failure and inhibits precise three-dimensional model data acquisition. When the alignment failure occurs, the three-dimensional scanner may inform a user of the alignment failure.

There are various ways in which the three-dimensional scanner informs a user of the alignment failure. In general, a user may watch a target in a process of scanning the target by using a three-dimensional scanner. That is, it is difficult for the user to continuously check a user interface screen of a display on which image data acquired by the three-dimensional scanner during the scanning process is displayed. When the user continuously checks the user interface screen, the fatigue of the user may increase rapidly and the concentration of the user may be dispersed in the process of scanning the target, which may cause a reduction in the accuracy of data in acquiring a three-dimensional model for a patient's oral cavity.

Accordingly, as a suitable method in which a three-dimensional scanner informs a user of an alignment failure, it is possible to use at least one of a method of visually expressing the alignment failure by using a light projector built in the three-dimensional scanner, a method of aurally expressing the alignment failure by using a sound output device built in or separately provided in the three-dimensional scanner, and a method of expressing the alignment failure in a tactile manner by using an actuator built in the three-dimensional scanner. By informing the user of the alignment failure using such a method, the user's attention may not be dispersed and the user can easily recognize whether the alignment has failed.

As described above, some of the user's five senses (for example, a visual method using light irradiation of a light projector, an auditory method using sound generated from a speaker, and a tactile method using vibration of an actuator) may be used as the method in which the three-dimensional scanner informs the user of a specific state. However, when the visual method using light irradiation is used, the light emission order (light emission sequence) of the light projector is set as an optimal order for acquiring three-dimensional data representing a target. Therefore, it is technically difficult to change the preset light emission order in order to inform a user of the state of the three-dimensional scanner.

Furthermore, when the auditory method using sound generated from the speaker is used, a user may not hear the sound of the speaker due to noise generated according to the surrounding environment. Furthermore, since a patient hears the sound of the speaker together, patient's discomfort may occur in a patient treatment process.

Accordingly, it may be the most accurate and effective to inform a user of the state of the three-dimensional scanner by using the tactile method using the vibration of the actuator. However, in the case of using the method of informing a user of an alignment failure in a tactile manner through the vibration of the actuator, when the alignment failure occurs in a state where the three-dimensional scanner approaches a target, the actuator may vibrate and collide with the target. When the alignment failure occurs while a user actually scans a patient's oral cavity, a collision may occur between the three-dimensional scanner and the patient's oral cavity (teeth, gingiva, inside the cheek, or the like) due to the vibration of the actuator built in the three-dimensional scanner. In such a case, when the three-dimensional scanner touches the patient's teeth, the patient may feel uncomfortable. Particularly, when the patient's teeth touched by the three-dimensional scanner are teeth that require treatment, the patient may feel pain. More specifically, since the abutment or scan body in the oral cavity is a difficult part to scan due to the nature of a metal material, the aforementioned situations may frequently occur. Particularly, since a part installed with the device (indicating the abutment or scan body) is very sensitive to impact in a state where a fixture is not osseointegrated to an alveolar bone, the patient's discomfort may be increased.

SUMMARY

Various embodiments are directed to providing a three-dimensional scanning system that acquires a distance between a three-dimensional scanner and a target and deactivates feedback means that may cause discomfort to a patient during a scanning process on the basis of the distance, and a method for controlling the same.

Technical problems to be solved in the present disclosure are not limited to the aforementioned technical problems and the other unmentioned technical problems will be clearly understood by those skilled in the art from the following description.

In order to achieve the above object, a method for controlling a three-dimensional scanning system according to the present disclosure includes: a scanning step of scanning a target by using a three-dimensional scanner and acquiring a distance between the three-dimensional scanner and the target; and a switching step of switching an activation state of at least one feedback means on the basis of the distance.

Furthermore, the method for controlling the three-dimensional scanning system according to the present disclosure may further include other additional steps, in addition to the aforementioned steps, thereby minimizing a patient's discomfort while allowing a user to acquire a high-quality three-dimensional model.

Furthermore, a three-dimensional scanning system for performing a method for controlling the three-dimensional scanning system, includes: a three-dimensional scanner configured to scan a target to acquire scan data representing the target; at least one feedback means configured to generate a feedback according to a state of the scan data; and a control unit configured to switch an activation state of the feedback means on the basis of the scan data.

Furthermore, the three-dimensional scanning system according to the present disclosure may further include other additional configurations, in addition to the aforementioned configurations, thereby minimizing a patient's discomfort while allowing a user to acquire a high-quality three-dimensional model.

By using a three-dimensional scanning system and a method for controlling the same according to the present disclosure, a user has the advantage of preventing a three-dimensional scanner from unintentionally colliding with a target due to vibration of the three-dimensional scanner when the three-dimensional scanner approaches the target.

Furthermore, since an actuator is deactivated at the time of failure of an alignment process between three-dimensional scan shots, which is necessary to acquire a high-quality three-dimensional model, there is an advantage in that discomfort caused to a user and a patient while scanning a target can be minimized and as a result, a user can acquire a high-quality three-dimensional model.

Furthermore, since the state of scan data is fed back to a user through other feedback means other than vibration feedback by an actuator, there is an advantage in that a user can quickly recognize a problem situation without watching a display unit in a state where discomfort caused to a patient is minimized.

Furthermore, since whether a three-dimensional scanner and a target are close to each other is determined on the basis of a measured value additionally acquired from a distance between the three-dimensional scanner and the target, there is an advantage in that it is possible to improve the accuracy of determining whether the three-dimensional scanner and the target are close to each other, and to stably activate or deactivate vibration feedback by an actuator.

Furthermore, since an actuator is deactivated when a target is the patient's actual oral cavity, vibration feedback by an actuator is operated when a target that does not cause discomfort to a patient is scanned, so that a user can quickly recognize a problem situation.

DETAILED DESCRIPTION

Figure 1:
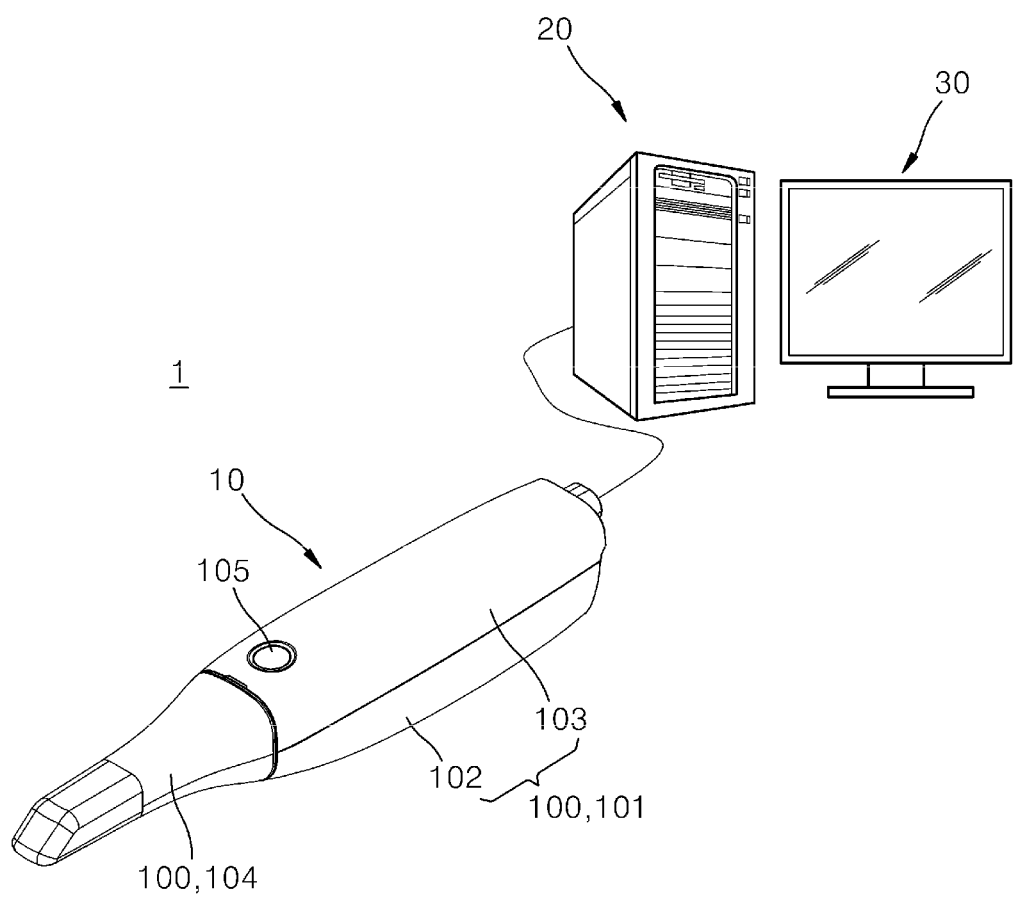
FIG. 1 illustrates a schematic configuration of a three-dimensional scanning system used in a method for controlling the same according to the present disclosure.

Hereinafter, some embodiments of the present disclosure will be described in detail with reference to exemplary drawings. It is to be noted that in assigning reference numerals to components in the drawings, the same reference numerals denote the same components throughout the drawings even in cases where the components are shown in different drawings. Furthermore, in describing the present disclosure, a detailed description of the publicly-known configurations or functions related to the present disclosure will be omitted if it is deemed to obscure the subject matter of the present disclosure.

In describing the components of embodiments of the present disclosure, terms, such as the first, the second, A, B, (a), and (b) may be used. However, the terms are used only to distinguish one component from another component, and the essence, order, or sequence of the components are not limited by the terms. Unless otherwise defined, all terms used herein, including technical or scientific terms, have the same meanings as the terms generally understood by those skilled in the art in the art to which the present disclosure pertains. Terms such as terms defined in dictionaries, which are generally used, should be interpreted as having meanings identical to contextual meanings of the related art, and are not interpreted as ideal or excessively formal meanings unless they are definitely defined in the present application.

FIG. 1 illustrates a schematic configuration of a three-dimensional scanning system 1 used in a method for controlling the same according to the present disclosure.

Referring to FIG. 1, the three-dimensional scanning system 1 according to the present disclosure may include a three-dimensional scanner 10 and a control unit 20. The three-dimensional scanner 10 may be used to scan a target to acquire scan data representing the target. For example, the three-dimensional scanner 10 may be a handheld scanner that is gripped by a user to scan a target at a free distance and angle. Furthermore, the three-dimensional scanner 10 may be a table scanner that scans a target mounted on a tray by rotating or tilting the target. However, for the purpose of the present disclosure, it is preferable that a handheld scanner is used as the three-dimensional scanner 10 used in the three-dimensional scanning system 1 according to the present disclosure.

On the other hand, the target means a real thing of a three-dimensional model for dental treatment, and may be the inside of a patient's actual oral cavity. That is, a user may scan the inside of the patient's actual oral cavity with the three-dimensional scanner 10 and acquire a three-dimensional model representing the inside of the patient's actual oral cavity. Furthermore, the target may be another object representing shape information on the inside of the patient's actual oral cavity. For example, the target may be an impression model, which is a template acquired by making impressions on the patient's oral cavity, or an oral model generated by applying a plaster to the impression model.

The three-dimensional scanner 10 may include a case 100 that may be gripped by the user. The case 100 includes a scanner body 101 having components of the three-dimensional scanner 10 therein, and a scanner tip 104 detachably coupled to the scanner body 101.

The scanner body 101 may include a lower case 102 constituting a lower side of the scanner body 101 and an upper case 103 constituting an upper side of the scanner body 101 and coupled to the lower case 102. The scanner body 101 may safely protect the components of the three-dimensional scanner 10 inside the scanner body 101 from an external environment (physical impact, chemical reaction, or the like) by a combination of the lower case 102 and the upper case 103. However, the scanner body 101 is not necessarily limited to being formed by the combination of the lower case 102 and the upper case 103, and may be formed integrally or by a combination of three or more members.

The scanner tip 104 may guide light generated from the inside of the three-dimensional scanner 10 to be emitted to the outside, and guide light entering from the outside to the inside of the three-dimensional scanner 10.

The scanner body 101 may have a scan button 105 formed on one surface thereof. The user may acquire scan data by gripping the scanner body 101 and pressing the scan button 105. However, the process of acquiring the scan data may also be performed by selecting a scan start icon (not illustrated) displayed on a user interface screen in addition to the process of pressing the scan button 105.

The control unit 20 may switch an activation state of feedback means that informs (feeds back) the state of the scan data on the basis of the scan data acquired by the three-dimensional scanner 10. That is, the control unit 20 may activate or deactivate the feedback means according to a specific condition. The control unit 20 may be a computing device including a microprocessor capable of processing a data arithmetic operation. For example, the control unit 20 may be at least one of a personal computer (PC), a tablet device, and a server (including a cloud server).

The control unit 20 and the three-dimensional scanner may be electrically connected to each other. For example, the three-dimensional scanner 10 may be connected to the control unit 20 by wire, and transmit the scan data acquired in the scanning process to the control unit 20. As another example, the three-dimensional scanner 10 may be wirelessly connected to the control unit 20 and may wirelessly transmit the scan data acquired in the scanning process to the control unit 20. A detailed configuration of the control unit 20 will be described below.

A display unit 30 may display at least a part of the scan data acquired by the three-dimensional scanner 10. The display unit 30 may allow the user to visually check the process in which the scan data is acquired, the state of the acquired scan data, an orthodontic simulation result to which an orthodontic plan is applied based on the scan data, and the like. The display unit 30 may be at least one of known visual display devices such as a monitor, a tablet screen, and a touch screen.

Hereinafter, detailed configurations of the feedback means of feeding back the state of the scan data and the three-dimensional scanner 10 will be described in more detail.

Figure 2:
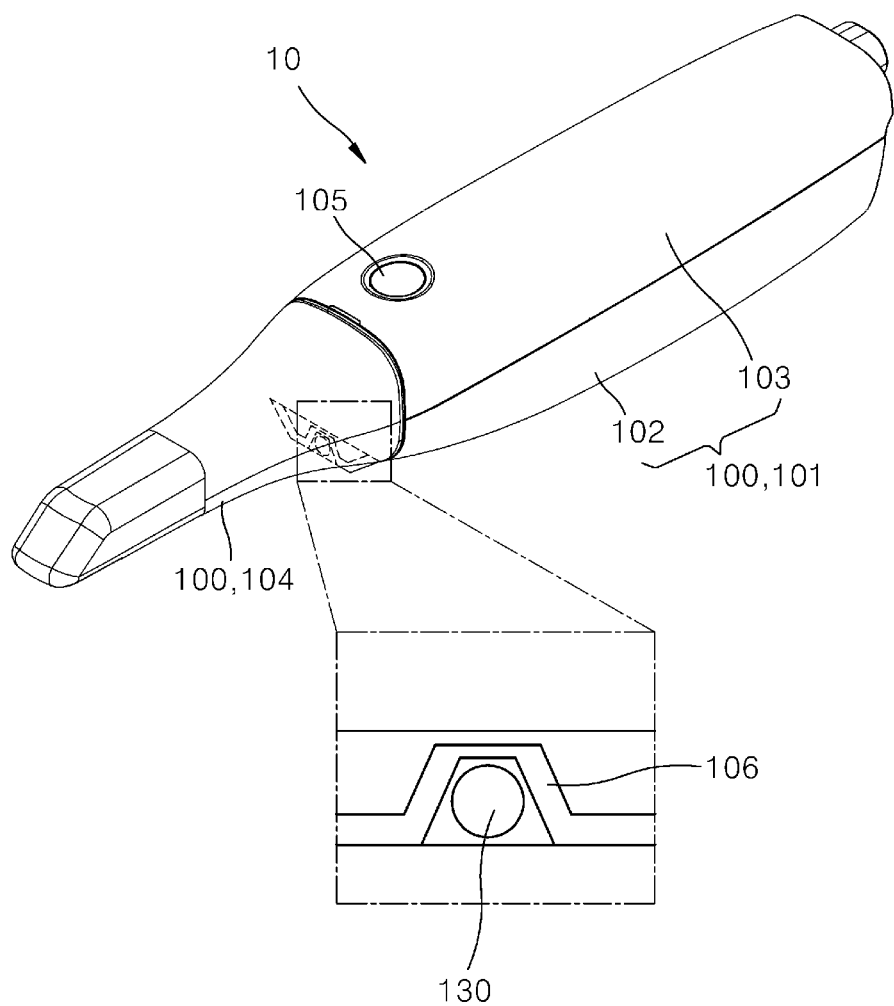
FIG. 2 is a schematic perspective view of a three-dimensional scanner that is one configuration of the three-dimensional scanning system according to the present disclosure.

FIG. 2 is a schematic perspective view of the three-dimensional scanner 10 that is one configuration of the three-dimensional scanning system 1 according to the present disclosure.

FIG. 2 illustrates a handheld three-dimensional scanner 10, for example. The scanner body 101 of the three-dimensional scanner 10 may further include a feedback means accommodation unit 106 that forms a predetermined accommodation space. For example, the feedback means accommodation unit 106 may be formed at the lower case 102 side of the scanner body 101; however, the present disclosure is not necessarily limited thereto. The feedback means for generating a feedback to the user according to the state of the scan data may be disposed in the accommodation space formed by the feedback means accommodation unit 106. More specifically, the feedback means accommodation unit 106 may be an actuator accommodation unit for accommodating an actuator 130 that vibrates according to a control signal, and the feedback means disposed in the actuator accommodation unit may be an actuator 130 that vibrates the three-dimensional scanner 10. The feedback means accommodation unit 106 may be formed adjacent to a part which the user grips when using the three-dimensional scanner 10. Accordingly, the actuator 130 is disposed close to the user's hand, so that the user may easily detect the vibration of the actuator for feeding back the state of the scan data.

Figure 3:
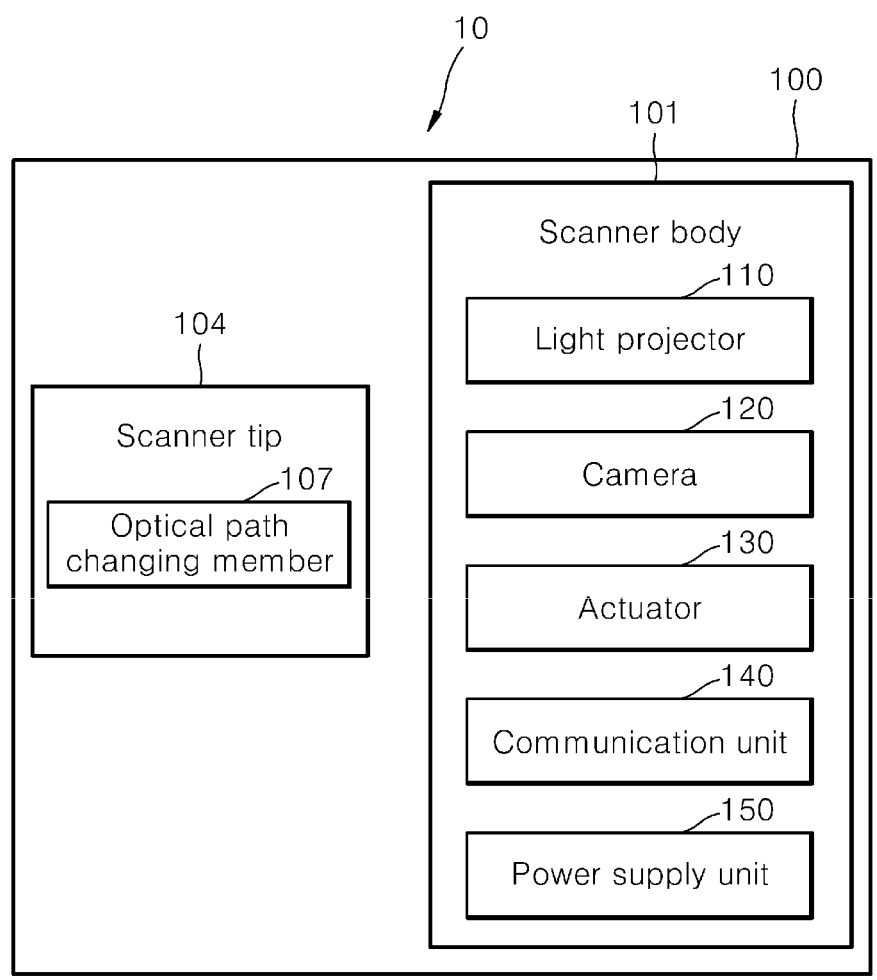
FIG. 3 is a schematic configuration diagram of the three-dimensional scanner that is one configuration of the three-dimensional scanning system according to the present disclosure.

FIG. 3 is a schematic configuration diagram of the three-dimensional scanner 10 that is one configuration of the three-dimensional scanning system 1 according to the present disclosure.

Referring to FIG. 2 and FIG. 3, a plurality of components may be embedded in the scanner body 101 of the three-dimensional scanner 10. For example, the three-dimensional scanner 10 may include a light projector 110 that generates light from the inside of the three-dimensional scanner 10. The light projector 110 may generate predetermined light (internal light) to illuminate a target in order to easily acquire scan data of the target. For example, in order to easily acquire the color of scan data representing the target, the light projector 110 may generate light having a wavelength range in a visible ray region and emit the generated light to the target. Furthermore, in order to easily acquire a three-dimensional shape (for example, a curvature of a three-dimensional model surface) of the scan data representing the target, the light projector 110 may generate structured light having a preset pattern and emit the generated light to the target. For example, in order to acquire a three-dimensional shape of the scan data, the light projector 110 may emit structured light having a stripe pattern to the target; however, the structured light is not necessarily limited to the aforementioned stripe pattern.

Furthermore, the three-dimensional scanner 10 includes at least one camera 120 that receives light reflected from the surface of the target. The camera 120 may generate two-dimensional images or three-dimensional scan shots on the basis of light entering from the outside to the inside of the three-dimensional scanner 10. For example, a lens of the camera 120 may receive light entering the three-dimensional scanner 10, and an imaging sensor of the camera 120 may generate two-dimensional images or three-dimensional scan shots on the basis of the light received by the lens of the camera 120. At least one of known sensors such as a CCD sensor, a CMOS sensor, a color imaging sensor may be used the imaging sensor. The camera 120 may be one single camera; however, the present disclosure is not limited thereto and the camera 120 may be two or more multi-cameras.

In the aforementioned description, at least a part of the light generated from the light projector 110 may be emitted to the outside of the three-dimensional scanner 10 through an opening formed on one side of the scanner tip 104. In such a case, the light generated from the light projector 110 may be refracted and/or reflected by an optical path changing member 107 disposed inside the scanner tip 104, and may be guided toward the opening. Furthermore, at least a part of the light reflected from the surface of the target may be incident into the three-dimensional scanner 10 through the opening formed at one side of the scanner tip 104. The light incident into the three-dimensional scanner 10 may be refracted and/or reflected by the optical path changing member 107, and may be guided toward the lens of at least one camera 120.

Furthermore, the three-dimensional scanner 10 may include the actuator 130. The actuator 130 may generate preset vibration in order to feed back, to the user, an operating state of the three-dimensional scanner 10 and the state of the scan data acquired from the scanning process of the three-dimensional scanner 10. For example, the actuator 130 may vibrate when an alignment process of the scan data fails.

Furthermore, the three-dimensional scanner 10 may further include a communication unit 140 inside the scanner body 101. The communication unit 140 may enable data communication with the control unit 20, and transmit, to the control unit 20, the scan data acquired from the scanning process of the three-dimensional scanner 10. Furthermore, the communication unit 140 may receive a control signal transmitted by the control unit 20, so that the control unit 20 may control the operation of the three-dimensional scanner 10. As the communication unit 140, a known wired communication device and/or wireless communication device may be used.

The three-dimensional scanner 10 may further include a power supply unit 150 inside the scanner body 101. The power supply unit 150 may serve to supply power required for the operation of the light projector 110, the camera 120, the actuator 130, and the communication unit 140. For example, the power supply unit 150 may be connected to an external power supply by wire, and supply power received by the external power supply to the components of the three-dimensional scanner 10. As another example, the power supply unit 150 may directly supply power to the components without connecting to the external power supply. In such a case, the power supply unit 150 may be a battery. The three-dimensional scanner 10 may be a wired scanner or a wireless scanner depending on the power supply method of the power supply unit 150.

Hereinafter, the feedback means will be described in more detail.

The feedback means may feed back at least one of the state of the three-dimensional scanner 10 and the state of the scan data acquired by the three-dimensional scanner 10 to the user. More specifically, the feedback means may generate a feedback operation when the state of the three-dimensional scanner 10 and the state of the scan data acquired by the three-dimensional scanner 10 do not satisfy predetermined criteria. For example, the feedback means may be the light projector 110 that emits light to the outside of the three-dimensional scanner 10. The light projector 110 may emit specific color of light or pattern light for feeding back the state of the three-dimensional scanner 10 or the state of the scan data. For example, the light projector 110 may emit blue light when the target is scanned, and emit red light when the state of scan data does not satisfy the predetermined criteria. As another example, the light projector 110 may emit stripe-shaped light when the target is scanned, and emit pattern light having a pattern of English letters 'X' when the state of scan data does not satisfy the predetermined criteria. Accordingly, the user may visually recognize the state of the scan data.

Furthermore, the feedback means may be the aforementioned actuator 130. For example, the actuator 130 may vibrate when the state of the scan data does not satisfy the predetermined criteria. Accordingly, the user may recognize the state of the scan data in a tactile manner.

Furthermore, the feedback means may be a speaker (not illustrated) that generates sound. The speaker may be connected to the control unit 20. Alternatively, the speaker may also be an additional component built in the three-dimensional scanner 10. For example, the speaker may generate sound (for example, beep sound) when the state of the scan data does not satisfy the predetermined criteria. Accordingly, the user may audibly recognize the state of the scan data.

Furthermore, the feedback means may be the display unit 30. The display unit 30 may display the state of the scan data on a screen when the state of the scan data does not satisfy the predetermined criteria. For example, when the alignment of the scan data fails, the display unit 30 may change the color of a scan box formed on the user interface screen and to which the three-dimensional scan shots acquired by the three-dimensional scanner 10 are input. Accordingly, the user may visually recognize the state of the scan data.

In order to feed back the state of the scan data to the user, at least one of the aforementioned feedback means may be used, and a plurality of feedback means may operate at the same time to feed back the state of the scan data to the user.

Hereinafter, a detailed configuration of the control unit 20 will be described in more detail.

Figure 4:
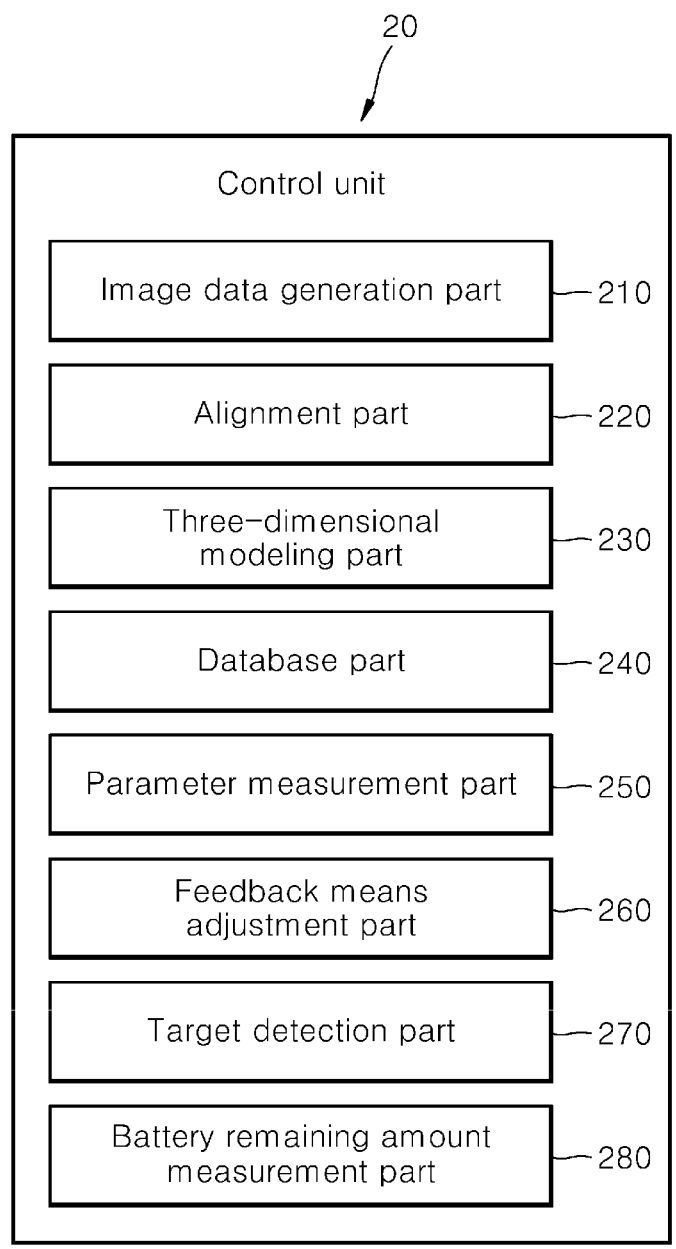
FIG. 4 is a schematic configuration diagram of a control unit that is one configuration of the three-dimensional scanning system according to the present disclosure.

FIG. 4 is a schematic configuration diagram of the control unit 20 that is one configuration of the three-dimensional scanning system 1 according to the present disclosure.

Referring to FIG. 1, FIG. 3, and FIG. 4, the control unit 20 may include an image data generation part 210. The image data generation part 210 may generate scan data on the basis of light received by the camera 120 of the three-dimensional scanner 10. In such a case, the scan data may be two-dimensional image data and/or three-dimensional scan shots obtained by three-dimensionalizing the two-dimensional image data. The control unit 20 may display the scan data generated by the image data generation part 210 through the display unit 30 in realtime.

The control unit 20 may include an alignment part 220. The alignment part 220 may align at least two three-dimensional scan shots of the scan data acquired by scanning the target. In such a case, aligning the three-dimensional scan shots may mean connecting and aligning mutually overlapping portions of the respective three-dimensional scan shots. The alignment part 220 may align the three-dimensional scan shots by using at least one of known alignment methods. For example, the alignment part 220 may align the three-dimensional scan shots by using an iterative closest point (ICP) method.

Furthermore, the control unit 20 may include a three-dimensional modeling part 230. The three-dimensional modeling part 230 may generate a three-dimensional model by merging the aligned three-dimensional scan shots. The user may establish an orthodontic plan (tooth deletion, tooth extraction, or the like) by using the three-dimensional model generated by the three-dimensional modeling part 230, perform an orthodontic simulation based on the orthodontic plan, or apply a virtual prosthesis prior to manufacturing a real prosthesis to be applied to a patient's oral cavity.

Furthermore, the control unit 20 may include a database part 240. The database part 240 may store a logic for converting the scan data and the two-dimensional image data into three-dimensional scan shots, a logic for allowing the alignment part 220 to align the three-dimensional scan shots, a logic for allowing the three-dimensional modeling part 230 to perform merging, criteria for determining the state of the scan data, a logic for measuring a distance between the three-dimensional scanner 10 and the target, a logic for calculating an additional measured value from the measured distance, and the like.

Furthermore, the control unit 20 may include a parameter measurement part 250. The parameter measurement part 250 may acquire the distance between the three-dimensional scanner 10 and the target. For example, the distance between the three-dimensional scanner 10 and the target may be acquired as a depth value (for example, z value) of the scan data, and the depth value of the scan data may be a length of an optical path reaching the surface of the target on the basis of some configurations of the camera 120. Furthermore, the parameter measurement part 250 may further acquire an additional measured value on the basis of the acquired distance. For example, the additional measured value may be a scan volume including the nearest point.

Furthermore, the control unit 20 may include a feedback means adjustment part 260. The feedback means adjustment part 260 may activate or deactivate at least one of the aforementioned feedback means. The criteria for activating or deactivating the feedback means may be the distance and/or the measurement value acquired by the parameter measurement part 250. For example, the feedback means adjustment part 260 may selectively deactivate specific feedback means when the acquired distance between the three-dimensional scanner 10 and the target is equal to or less than a pre-stored threshold. For example, when the distance is equal to or less than the pre-stored threshold, the feedback means adjustment part 260 may deactivate the actuator 130 by applying a control signal to the three-dimensional scanner 10. Accordingly, when the distance between the three-dimensional scanner 10 and the target is short, the three-dimensional scanner 10 may be determined to be adjacent to the target, and when the three-dimensional scanner 10 is adjacent to the target, a vibration feedback by the actuator 130 may be switched to be deactivated.

Furthermore, the control unit 20 may include a target detection part 270. The target detection part 270 may detect a type of the target represented by the scan data acquired through the scanning of the three-dimensional scanner 10. For example, when the user scans the inside of the patient's actual oral cavity with the three-dimensional scanner 10, the target detection part 270 may detect that the target is the inside of the patient's actual oral cavity. As another example, when the user scans the oral cavity model with the three-dimensional scanner 10, the target detection part 270 may detect that the target is the oral cavity model. The feedback means adjustment part 260 may determine whether to selectively activate or deactivate the feedback means according to the target detection result of the target detection part 270. For example, even though the distance between the three-dimensional scanner 10 and the target is equal to or less than the pre-stored threshold, when the type of the target detected by the target detection part 270 is the impression model or the oral cavity model, the feedback means adjustment part 260 may not deactivate the actuator 130 among the feedback means.

Furthermore, the control unit 20 may further include a battery remaining amount measurement part 280. When the power supply unit 150 of the three-dimensional scanner 10 is a battery, the battery remaining amount measurement part 280 may acquire the remaining amount of the battery. In such a case, when the remaining amount of the battery is equal to or less than a battery threshold, the feedback means may operate to generate a feedback to the user. However, even in such a case, when the distance and/or the measured value acquired by the parameter measurement part 250 is equal to or less than the pre-stored threshold, the feedback means adjustment part 260 may deactivate the actuator 130.

Hereinafter, a method for controlling the three-dimensional scanning system according to various embodiments of the present disclosure will be described in detail. In describing the method for controlling the three-dimensional scanning system according to various embodiments of the present disclosure, content overlapping that of the aforementioned three-dimensional scanning system may be briefly mentioned or omitted.

Figure 5:
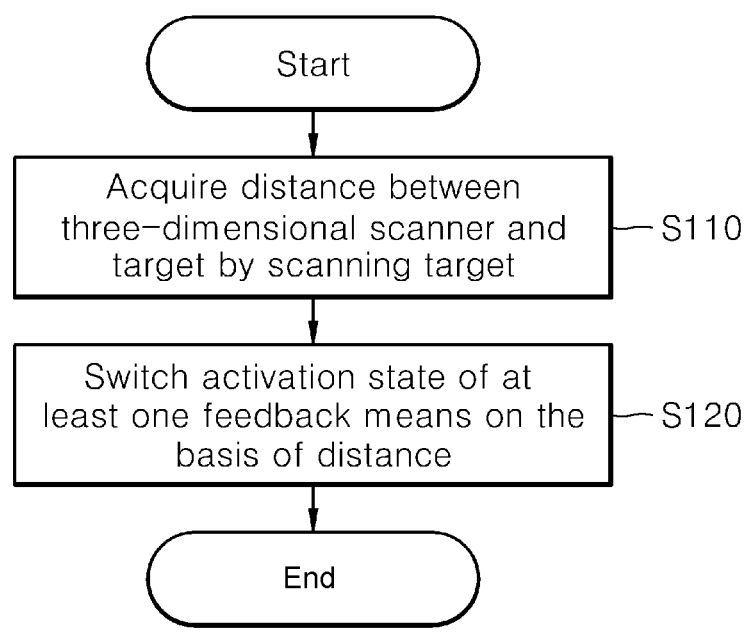
FIG. 5 is a flowchart of a method for controlling the three-dimensional scanning system according to a first embodiment of the present disclosure.
Figure 6:
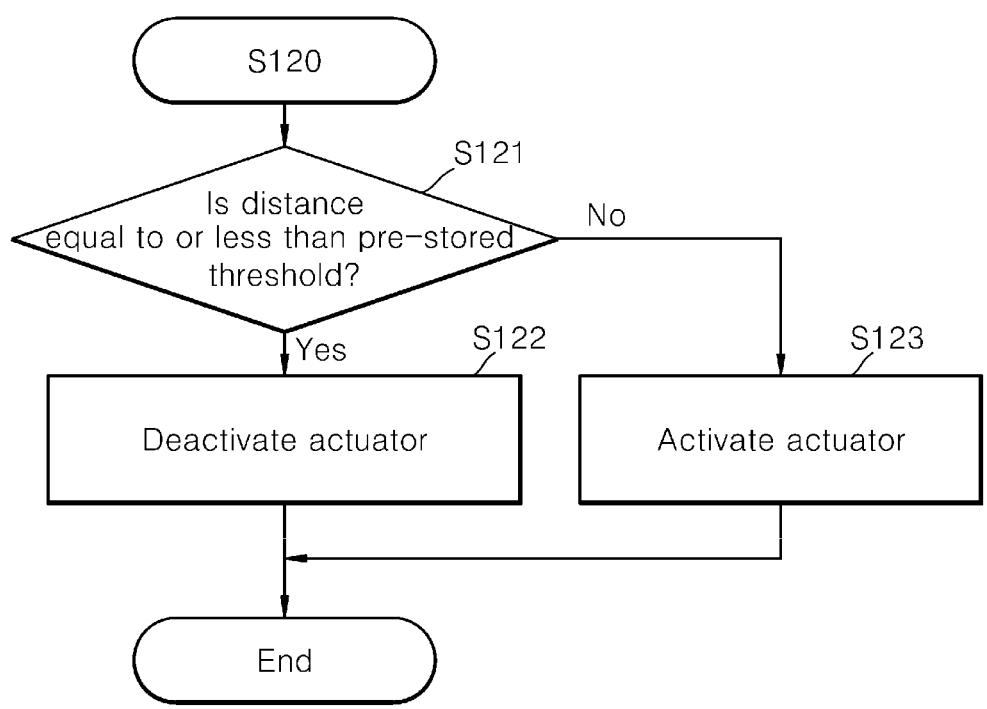
FIG. 6 is a detailed flowchart of a switching step S120 in FIG. 5.

FIG. 5 is a flowchart of a method for controlling the three-dimensional scanning system according to a first embodiment of the present disclosure, and FIG. 6 is a detailed flowchart of a switching step S120 in FIG. 5. Furthermore, FIG. 7 to FIG. 10 are views for explaining various embodiments of acquiring a distance between the three-dimensional scanner 10 and a target O.

Figure 7:
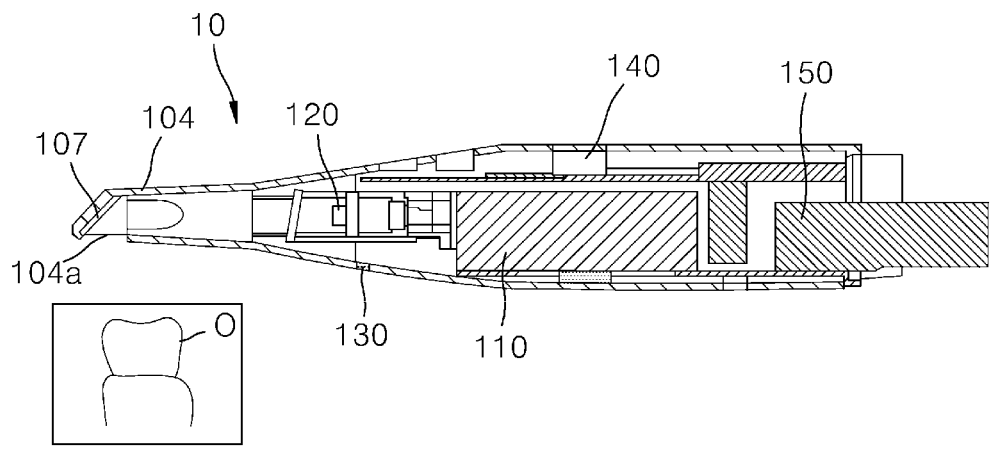
FIG. 7 to FIG. 10 are views for explaining various embodiments of acquiring a distance between the three-dimensional scanner and a target.

Referring to FIG. 5 to FIG. 7, the method for controlling the three-dimensional scanning system according to the first embodiment of the present disclosure may include a scanning step S110 and a switching step S120.

First, in the scanning step S110, the user may use the three-dimensional scanner 10 and the three-dimensional scanner 10 may scan the target O. As described above, the target O may be one of the patient's actual oral cavity, the impression model, and the oral cavity model. In order to precisely acquire scan data representing the target O, the user may grip the three-dimensional scanner 10 and move the three-dimensional scanner 10 to have various scanning distances and various scanning angles with respect to the target O. In the scanning step S110, the three-dimensional scanner 10 may acquire the scan data representing the target O, and the scan data may be two-dimensional image data and/or three-dimensional scan shots.

On the other hand, in a case where the step S110 in which the three-dimensional scanner 10 approaches the target O and scans the target O is performed, when the three-dimensional scanner 10 vibrates, the three-dimensional scanner 10 may collide with the target O. When the target O is the inside of the patient's actual oral cavity, since the three-dimensional scanner 10 may collide with the teeth, the gingiva, or the inner wall of the cheek due to the vibration of the three-dimensional scanner 10, which may cause the patient to feel uncomfortable in the scanning process. Particularly, when the three-dimensional scanner 10 collides with a patient's target tooth due to the vibration of the three-dimensional scanner 10, the patient may experience discomfort such as pain or bleeding. Accordingly, when the distance between the three-dimensional scanner 10 and the target O is short, the vibration of the three-dimensional scanner 10 needs to be suppressed.

Accordingly, in the scanning step S110, the distance, which is a separation distance between the three-dimensional scanner 10 and the target O, may be acquired. That is, in the scanning step S110, the three-dimensional scanner 10 may scan the target O to acquire three-dimensional data (for example, three-dimensional scan shots), and the distance between the three-dimensional scanner 10 and the target O may be automatically measured and acquired in the process of acquiring the three-dimensional data. The process of acquiring the distance in the scanning step S110 may be performed by the parameter measurement part 250 that is one configuration of the control unit 20 of the three-dimensional scanning system according to the present disclosure described above.

The distance between the three-dimensional scanner 10 and the target O may be acquired from a depth value in the z-axis direction of the scan data. For example, when the three-dimensional scanner 10 acquires the scan data by scanning the target O, the three-dimensional scan shot of the scan data may have a width (x-axis direction), a length (y-axis direction), and a depth (z-axis direction) in the three-dimensional space. In such a case, the distance between the three-dimensional scanner 10 and the target O may be acquired on the basis of the depth (for example, the z-axis direction) of the three-dimensional scan shot.

More specifically, the three-dimensional scan shots include a plurality of points, and aligned three-dimensional scan shots also include a plurality of points. In such a case, the depth value of the scan data may be acquired on the basis of the nearest point having a minimum coordinate value with respect to one axis among the points of the scan data (more specifically, the aligned three-dimensional scan shots). For example, the depth value of the scan data may be acquired as a depth value (z value) of the nearest point having a minimum coordinate value in the z-axis direction among the points included in the scan data. That is, the distance between the three-dimensional scanner 10 and the target O may be acquired with respect to a point formed at the highest position among the scan data.

On the other hand, the distance between the three-dimensional scanner 10 and the target O may be acquired on the basis of an optical path length between a part of the camera 120 embedded in the three-dimensional scanner 10 and the target O. For example, Referring to FIG. 8, a distance z between the three-dimensional scanner 10 and the target O may be a distance between one surface of the lens of the camera 120 and the nearest point P of the target O, which meets the target O along an optical path. As another example, the distance z between the three-dimensional scanner 10 and the target O may be a distance between the image sensor of the camera 120 and the nearest point P of the target O, which meets the target O along an optical path.

When the scanning step S110 is performed, the switching step S120 of switching an activation state of the feedback means may be performed by the feedback means adjustment part 260 of the control unit 20. The switching step S120 may switch an activation state of at least one feedback means on the basis of the distance acquired in the scanning step S110. For example, when the distance between the three-dimensional scanner 10 and the target O is equal to or less than a pre-stored threshold, the feedback means may be selectively deactivated.

The switching step S120 will be described in more detail. Referring to FIG. 6, the switching step S120 may include a distance determination step S121. In the distance determination step S121, the distance acquired in the scanning step S110 may be compared with the pre-stored threshold. The pre-stored threshold may be a recommended minimum distance between the three-dimensional scanner 10 and the target O. In the distance determination step S121, when the acquired distance is equal to or less than the pre-stored threshold, the vibration of the actuator 130 among the feedback means may cause discomfort to a patient. Accordingly, when the acquired distance is equal to or less than the pre-stored threshold, an actuator deactivation step S122 may be performed, so that the feedback means adjustment part 260 may deactivate the actuator 130 embedded in the three-dimensional scanner 10. The "deactivation" may mean that a control signal for feeding back the state of the three-dimensional scanner 10 and the state of the scan data (hereinafter, referred to as a feedback situation) is not transmitted to corresponding feedback means. As another example, in the actuator deactivation step S122, the feedback means adjustment part 260 may adjust the power supply unit 150 of the three-dimensional scanner 10 not to supply the actuator with power for the operation of the actuator 130. Accordingly, the actuator 130 is deactivated in a state where the three-dimensional scanner 10 approaches the target O, which makes it possible to minimize discomfort that may be caused to a patient during the scanning process.

Hereinafter, the pre-stored threshold in the distance determination step S121 will be described in detail.

Figure 8:
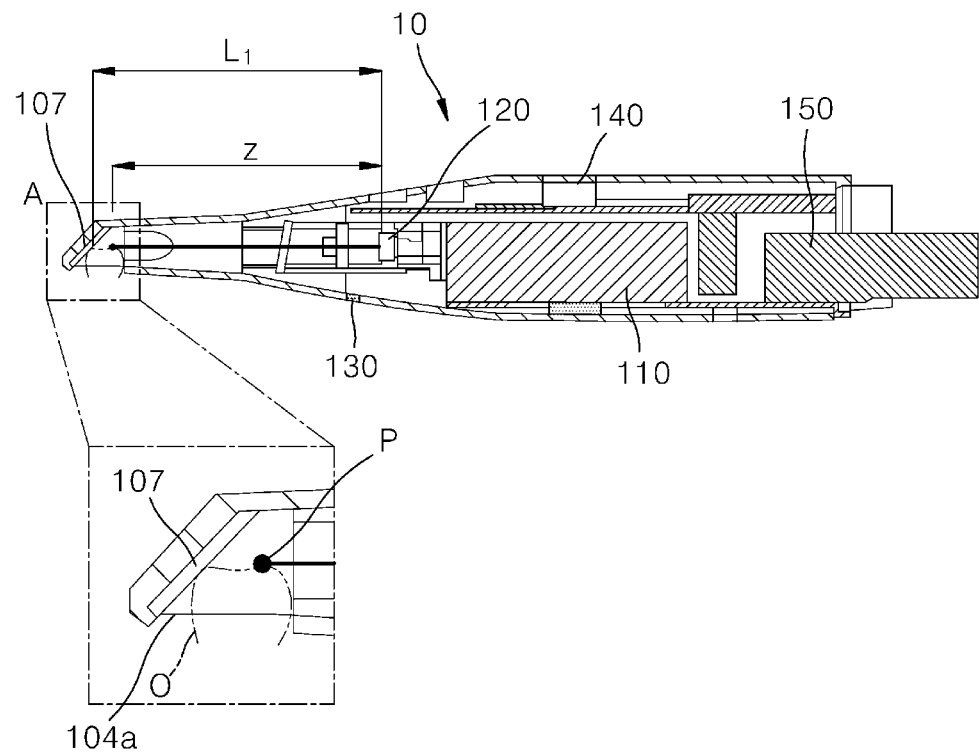

Referring to FIG. 8, at least a part of the target O may be introduced into the scanner tip 104 through an opening 104*a* formed at one side of the scanner tip 104. When the three-dimensional scanner 10 vibrates in a state where at least a part of the target O is introduced into the scanner tip 104, a patient may feel uncomfortable due to a collision between the three-dimensional scanner 10 and a target (for example, teeth). Accordingly, the threshold may be an optical path length L1 between the camera 120 and the optical path changing member 107 disposed inside one end of the three-dimensional scanner 10. In an enlarged view of part A in FIG. 8, the nearest point P of the target O may be disposed between the lens of the camera 120 and the optical path changing member 107. In such a case, since the distance z between the lens of the camera 120 and the nearest point P of the target O is equal to or less than the optical path length L1 between the lens of the camera 120 and the optical path changing member 107, the actuator deactivation step S122 may be performed.

Figure 9:
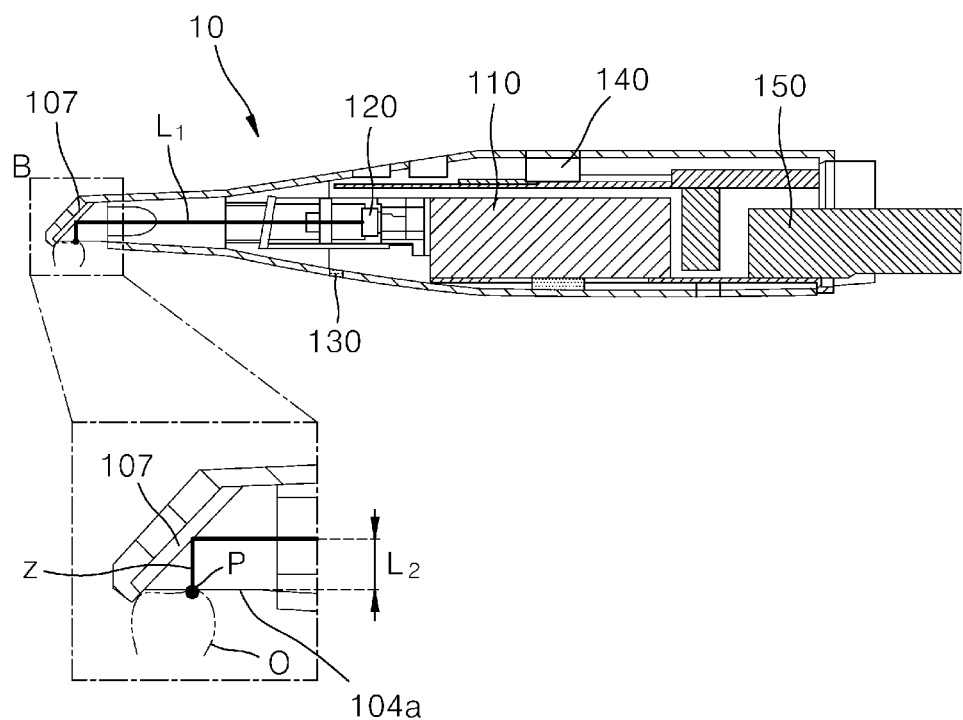

Referring to FIG. 9, at least a part of the target O may be introduced into the scanner tip 104 through the opening 104*a*. At this time, only a part of the target O may be introduced through the opening 104*a*. In such a case, there is a possibility that the three-dimensional scanner and the target O collide with each other due to the vibration of the three-dimensional scanner 10. Accordingly, the threshold may be an optical path length L1+L2 between the lens of the camera 120 and the opening 104*a* formed at one end of the three-dimensional scanner 10. In an enlarged view of part B in FIG. 9, the nearest point P of the target O may be disposed between the optical path changing member 107 and the opening 104*a*. Since the distance z between the lens of the camera 120 and the nearest point P of the target O is equal to or less than the sum L1+L2 of the optical path length L1 between the lens of the camera 120 and the optical path changing member 107 and the optical path length L2 between the optical path changing member 107 and the opening 104a, the actuator deactivation step S122 may be performed.

Figure 10:
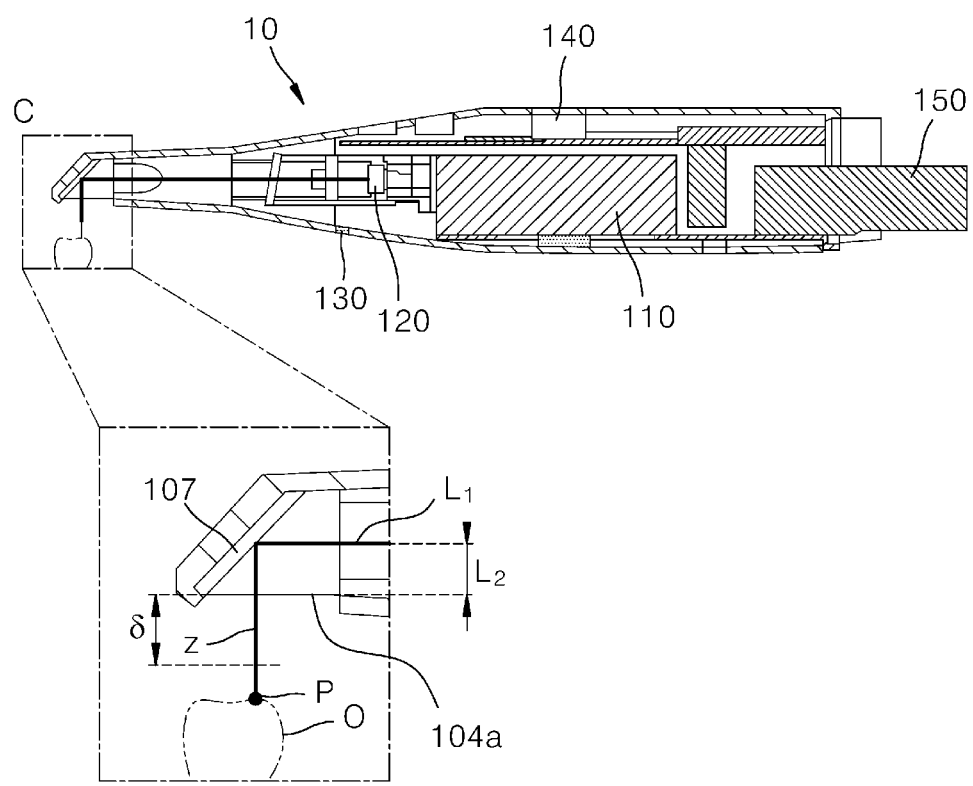

Referring to FIG. 10, the target O may not be introduced into the three-dimensional scanner 10. However, even though the target O is not directly introduced into the three-dimensional scanner 10, there is a possibility that the outside of the case 100 of the three-dimensional scanner 10 and the target O collide with each other due to the vibration of the three-dimensional scanner 10. Accordingly, the threshold may be an optical path length L1+L2+δ between the lens of the camera 120 and a virtual surface formed to be spaced apart by a predetermined offset to the outside of the opening 104a. In an enlarged view of part C in FIG. 10, the nearest point P of the target O may be disposed outside the three-dimensional scanner 10. When the distance z between the lens of the camera 120 and the nearest point P of the target O is equal to or less than the sum L1+L2+δ of the optical path length L1 between the lens of the camera 120 and the optical path changing member 107, the optical path length L2 between the optical path changing member 107 and the opening 104a, and the offset distance δ spaced apart from the opening 104a by a predetermined length, the actuator deactivation step S122 may be performed.

When the distance z is out of (exceeds) the pre-stored threshold, an actuator activation step S123 may be performed. For example, the actuator activation step S123 may mean that the feedback means adjustment part 260 of the control unit 20 transmits a control signal for informing the user of the feedback situation to the actuator 130 in the feedback situation. As another example, in the actuator activation step S123, the feedback means adjustment part 260 may adjust the power supply unit 150 of the three-dimensional scanner 10 to supply power for the operation of the actuator 130 to the actuator 130.

As described above, the actuator 130 may be activated or deactivated by comparing the distance z acquired in the scanning step S110 with the pre-stored threshold, which makes it possible to minimize discomfort that may be caused to a patient during the scanning process.

On the other hand, the threshold may be set differently according to a scan depth of the three-dimensional scanner 10. For example, when the scan depth of the three-dimensional scanner 10 is large, the threshold may be set to be relatively large, and when the scan depth of the three-dimensional scanner 10 is small, the threshold may be set to be relatively small. Particularly, when the scan depth of the three-dimensional scanner 10 is large, the offset δ may be set to be larger than when the scan depth of the three-dimensional scanner 10 is small. Accordingly, when the scan depth of the three-dimensional scanner 10 is large, the actuator 130 may be deactivated even when the target O is formed further away from the three-dimensional scanner 10.

Furthermore, before the switching step S120 of switching the activation state of the feedback means, two or more feedback means may operate. For example, in order to inform the user of the feedback situation, the light projector 110 and the actuator 130 may be activated. In such a case, in the switching step S120, the actuator 130 is deactivated, and the light projector 110 maintains the activated state.

As another example, one feedback means may operate. For example, in order to inform the user of the feedback situation, the actuator 130 may be activated. In such a case, in the switching step S120, the feedback means adjustment part 260 may deactivate the actuator 130 and activate the light projector 110, thereby allowing the user to visually recognize the feedback situation. However, the aforementioned description is illustrative, and other feedback means (for example, a speaker that generates sound in order to indicate the state of the scan data, a display unit that displays the state of the scan data on a screen, and the like) other than the light projector 110 may be used instead of the light projector 110 or may be used together with the light projector 110.

Hereinafter, a method for controlling the three-dimensional scanning system according to a second embodiment of the present disclosure will be described.

Figure 11:
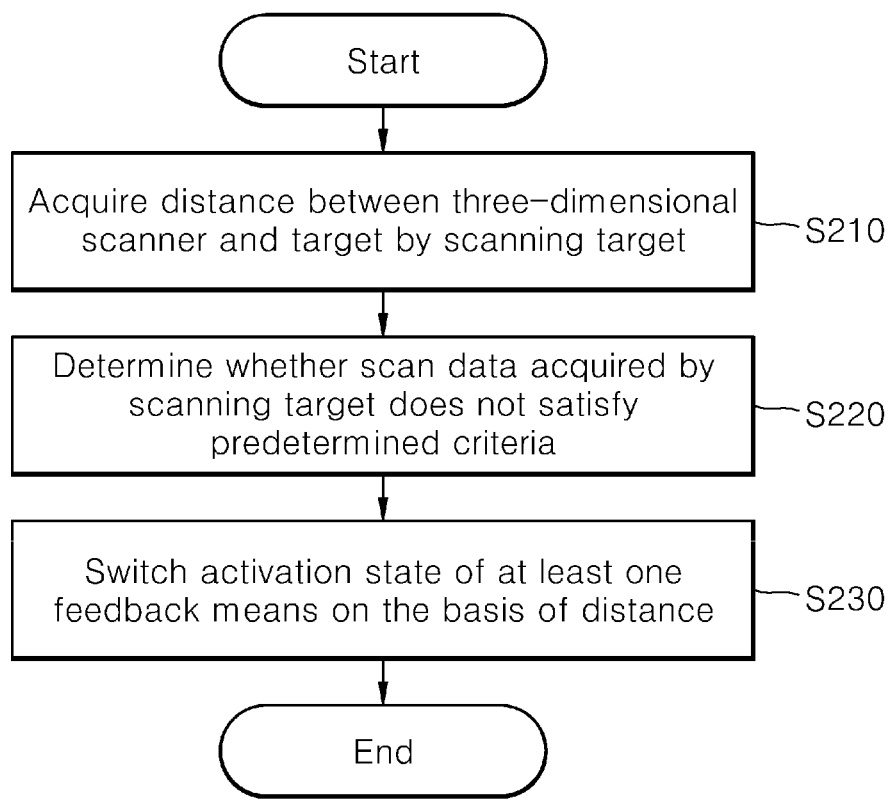
FIG. 11 is a flowchart of a method for controlling the three-dimensional scanning system according to a second embodiment of the present disclosure.
Figure 12:
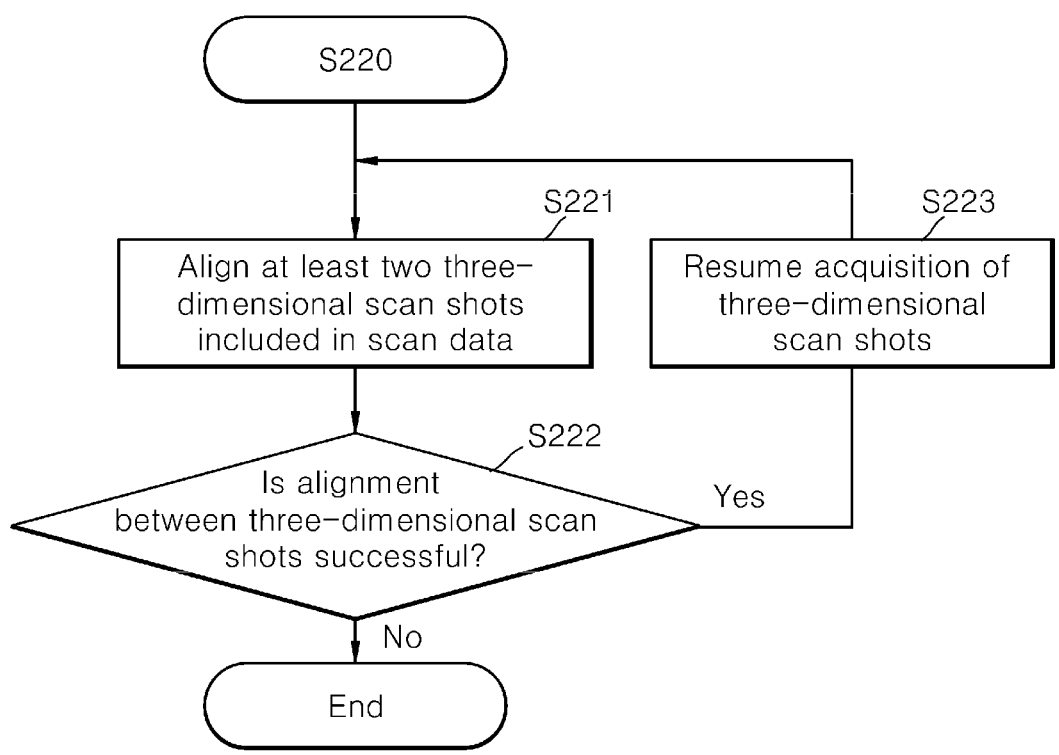
FIG. 12 is a detailed flowchart of a scan data determination step S220 in FIG. 11.

FIG. 11 is a flowchart of the method for controlling the three-dimensional scanning system according to the second embodiment of the present disclosure, and FIG. 12 is a detailed flowchart of a scan data determination step S220 in FIG. 11.

Referring to FIG. 11, the method for controlling the three-dimensional scanning system according to the second embodiment of the present disclosure may include a scanning step S210, the scan data determination step S220, and a switching step S230. Since the scanning step S210 is the same as the scanning step S110 in the method for controlling the three-dimensional scanning system according to the first embodiment of the present disclosure described above and the switching step S230 is the same as the switching step S120 in the method for controlling the three-dimensional scanning system according to the first embodiment of the present disclosure described above, detailed description thereof will be omitted.

In the method for controlling the three-dimensional scanning system according to the second embodiment of the present disclosure, the switching step S230 may be performed only when the state of the scan data does not satisfy the predetermined criteria in the scan data determination step S220. That is, the switching step S230 may not be performed when the state of the scan data is good.

The scan data determination step S220 will be described in more detail. Referring to FIG. 11 and FIG. 12, the predetermined criteria for determining the scan data may include whether alignment of at least two three-dimensional scan shots included in the scan data is successful. As described above, when the target O is scanned by using the three-dimensional scanner 10, a plurality of three-dimensional scan shots may be acquired. The plurality of three-dimensional scan shots may be aligned and merged by the control unit 20 and generated as a three-dimensional model. However, when the user does not precisely scan the target O in the process of scanning the target O, an overlapping portion between the three-dimensional scan shots does not exist, which may cause alignment between the three-dimensional scan shots to fail. When the alignment between the three-dimensional scan shots fails, a data gap may occur in the three-dimensional model. Particularly, a data gap in a portion representing a tooth may cause an orthodontic simulation error and incorrect prosthesis fabrication. Accordingly, whether the alignment is successful among the states of the scan data may be an important factor for acquiring a high-quality three-dimensional model.

In general, when the alignment between the three-dimensional scan shots fails, the alignment failure may be fed back to the user through feedback means. However, even in such a case, it is preferable that the vibration feedback by the actuator 130 is deactivated when the three-dimensional scanner 10 and the target O are close to each other. Accordingly, the scan data determination step S220 includes an alignment step S221 in which the alignment part 220 of the control unit 20 aligns at least two three-dimensional scan shots included in the scan data. The alignment step S221 may be a step in which the alignment part 220 of the control unit 20 aligns and connects the overlapping portions of the at least two three-dimensional scan shots as described above. On the other hand, the alignment step S221 may be performed through point-by-point alignment of a plurality of points constituting the three-dimensional scan shots, or may also be performed through region-by-region alignment of regions constituting the three-dimensional scan shots.

Then, the alignment part 220 of the control unit 20 may perform an alignment success determination step S222 of determining whether alignment is successful among the predetermined criteria for determining the state of the scan data. For example, when there is no overlapping point and/or region among the three-dimensional scan shots, the alignment between the three-dimensional scan shots may be determined to fail. As described above, when the determination result in the alignment success determination step S222 indicates that the alignment between the three-dimensional scan shots has failed, the switching step S230 may be performed. In the switching step S230, the feedback means may be deactivated on the basis of the alignment success or failure determined in the scan data determination step S220 and a result obtained by comparing the distance between the three-dimensional scanner 10 and the target O acquired in the scanning step S210 and the pre-stored threshold. On the other hand, when the determination result in the alignment success determination step S222 indicates that the alignment between the three-dimensional scan shots is successful, a three-dimensional scan shot acquisition resuming step S223 of resuming acquisition of three-dimensional scan shots is performed in which the three-dimensional scanner 10 continuously performs the scanning process without a feedback.

Hereinafter, a method for controlling the three-dimensional scanning system according to a third embodiment of the present disclosure will be described.

Figure 13:
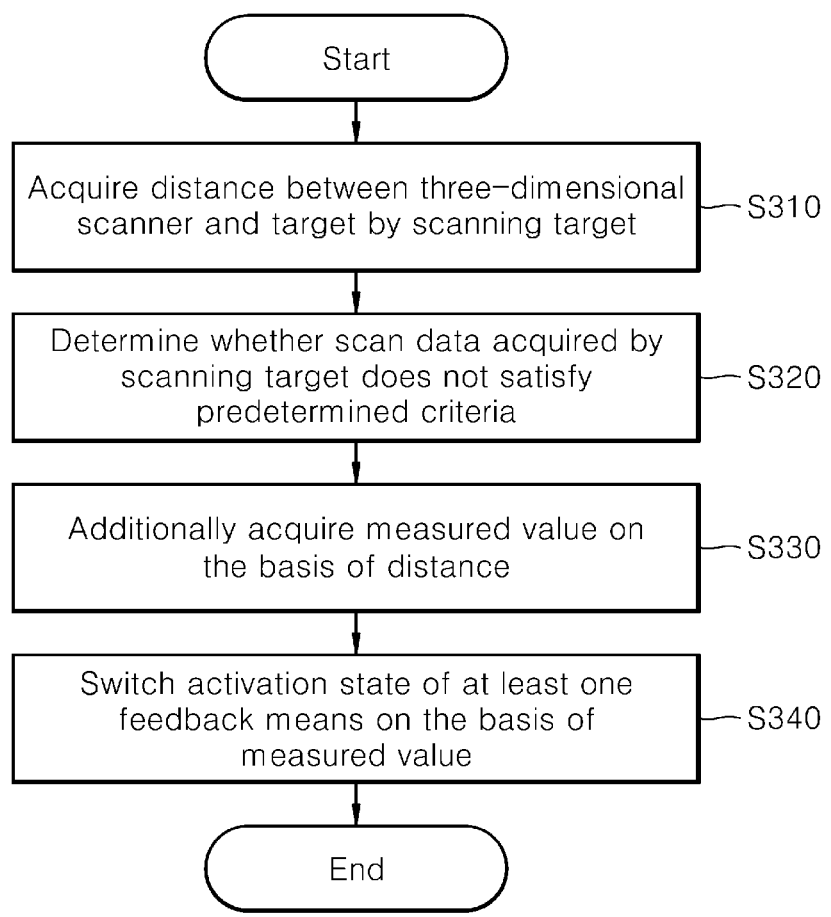
FIG. 13 is a flowchart of a method for controlling the three-dimensional scanning system according to a third embodiment of the present disclosure.

FIG. 13 is a flowchart of the method for controlling the three-dimensional scanning system according to the third embodiment of the present disclosure.

Referring to FIG. 13, the method for controlling the three-dimensional scanning system according to the third embodiment of the present disclosure may include a scanning step S310, a scan data determination step S320, an additional measurement value acquisition step S330, and a switching step S340 of switching an activation state of the feedback means. In the method for controlling the three-dimensional scanning system according to the third embodiment of the present disclosure, the scanning step S310 is the same as the scanning step S110 in the method for controlling the three-dimensional scanning system according to the first embodiment of the present disclosure and the scanning step S210 in the method for controlling the three-dimensional scanning system according to the second embodiment of the present disclosure. Furthermore, the scan data determination step S320 is the same as the scan data determination step S220 in the method for controlling the three-dimensional scanning system according to the second embodiment of the present disclosure. Therefore, detailed description thereof will be omitted.

In the additional measurement value acquisition step S330 in the method for controlling the three-dimensional scanning system according to the third embodiment of the present disclosure, the parameter measurement part 250 may acquire an additional measured value on the basis of the acquired distance z. For example, the parameter measurement part 250 may acquire a scan volume of the scan data representing the target O on the basis of the distance z. The scan volume may include the nearest point having a minimum coordinate value with respect to one axis among the points of the scan data.

Then, in the switching step 340, the feedback means may be selectively deactivated on the basis of a measured value associated with the distance z and additionally acquired on the basis of the distance z in the additional measurement value acquisition step S330. More specifically, the feedback means adjustment part 260 may determine whether the nearest point P, which is formed when the target O is closest to the three-dimensional scanner 10, is included in a threshold scan volume of the three-dimensional scanner 10, the nearest point P being formed in the scan volume that is a measured value associated with the distance z. When the nearest point P formed in the scan volume is included in the threshold scan volume, the three-dimensional scanner 10 and the target O may be determined to be close to each other. Accordingly, the feedback means adjustment part 260 of the control unit 20 may deactivate the actuator 130 of the three-dimensional scanner 10. As described above, by determining whether to deactivate the feedback means by using another measured value other than the distance z between the three-dimensional scanner 10 and the target O, it is possible to advantageously prevent erroneous determination on whether the three-dimensional scanner 10 and the target O are close to each other.

Hereinafter, a method for controlling the three-dimensional scanning system according to a fourth embodiment of the present disclosure will be described.

Figure 14:
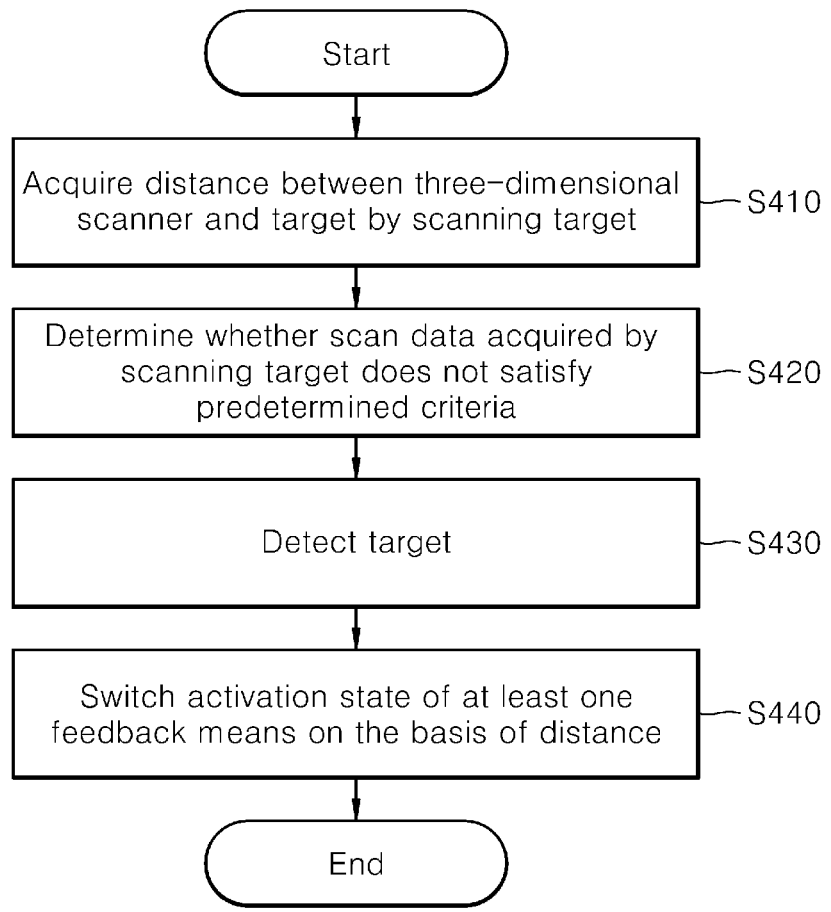
FIG. 14 is a flowchart of a method for controlling the three-dimensional scanning system according to a fourth embodiment of the present disclosure.

FIG. 14 is a flowchart of the method for controlling the three-dimensional scanning system according to the fourth embodiment of the present disclosure.

Referring to FIG. 14, the method for controlling the three-dimensional scanning system according to the fourth embodiment of the present disclosure may include a scanning step S410, a scan data determination step S420, a target detection step S430, and a switching step S440 of switching an activation state of the feedback means. In the method for controlling the three-dimensional scanning system according to the fourth embodiment of the present disclosure, the scanning step S410 may be the same as the scanning steps S110, S210, and S310 in the methods for controlling the three-dimensional scanning system according to the first to third embodiments of the present disclosure. Furthermore, the scan data determination step S420 is the same as the scan data determination steps S220 and S320 in the methods for controlling the three-dimensional scanning system according to the second and third embodiments of the present disclosure. Therefore, detailed description thereof will be omitted.

The method for controlling the three-dimensional scanning system according to the fourth embodiment of the present disclosure may further include the target detection step S430. In the target detection step S430, the target detection part 270 may detect a type of the target O scanned by the three-dimensional scanner 10. For example, the target detection part 270 may detect whether the target O scanned by the three-dimensional scanner 10 is the inside of the patient's actual oral cavity, the impression model, or the oral cavity model. In the target detection step S430, the target detection part 270 may use pre-learned information in order to detect the target O. The pre-learned information may be a target detection logic learned through artificial intelligence and stored in the database part 240 of the control unit 20, and the target detection logic may include information on characteristics of each of the inside of the patient's actual oral cavity, the impression model, and the oral cavity model. In the target detection step S430, when the detected type of the target O is the impression model or the oral cavity model, the feedback means adjustment part 260 may not deactivate the vibration feedback of the actuator 130. When the type of the target O is the impression model or the oral cavity model, even though the three-dimensional scanner 10 vibrates, a problem that causes discomfort to a patient does not occur. This is because the vibration feedback of the actuator 130 is means capable of easily informing the user of the feedback situation including the state of the scan data. On the other hand, in the target detection step S430, when the target detection part 270 detects the target O as the inside of the patient's actual oral cavity, the distance between the three-dimensional scanner 10 and the target O may be acquired and appropriate control (control of deactivating the actuator) may be performed accordingly. That is, when the type of the target O is detected as the inside of the patient's actual oral cavity, the switching step S440 may be performed to prevent the actuator 130 from generating the vibration feedback when the three-dimensional scanner 10 is close to the patient's oral cavity. By switching whether to activate the feedback means according to the type of the target O, the vibration feedback by the actuator 130 is operated in a scanning process that does not cause discomfort to a patient, and the vibration feedback by the actuator 130 is deactivated in a scanning process that causes discomfort to a patient. Consequently, there is an advantage in that it is possible to minimize discomfort that may be caused to a patient in a scanning process using the three-dimensional scanner 10.

Furthermore, by activating or deactivating various feedback means as needed by using a three-dimensional scanning system and a method for controlling the same according to the present disclosure, there is an advantage in that a user can easily perform a scanning process without watching the display unit 30

The above description is merely intended to illustratively describe the technical spirit of the present disclosure, and various changes and modifications can be made by those skilled in the art to which the present disclosure pertains without departing from the essential features of the present disclosure.

Therefore, the embodiments disclosed in the present disclosure are not intended to limit the technical spirit of the present disclosure, but are intended to describe the present disclosure. The scope of the technical spirit of the present disclosure is not limited by these embodiments. The scope of the present disclosure should be interpreted by the accompanying claims and all technical spirits falling within the equivalent scope thereto should be interpreted as being included in the scope of the present disclosure.

What is claimed is:

1. A method for controlling a three-dimensional scanning system, the method comprising:
    scanning a target by using a three-dimensional scanner and acquiring a distance between the three-dimensional scanner and the target; and
    switching an activation state of at least one actuator on the basis of the distance,
    wherein the switching is performed when a state of scan data acquired from the three-dimensional scanner does not satisfy predetermined criteria,
    wherein in the switching, when the distance is equal to or less than a pre-stored threshold, the actuator is selectively deactivated to prevent collision between the three-dimensional scanner and the target.

2. The method according to claim 1, wherein the predetermined criteria include whether alignment of at least two three-dimensional scan shots included in the scan data is successful.

3. The method according to claim 1, further comprising:
    aligning at least two three-dimensional scan shots included in the scan data; and
    determining whether alignment is successful among the predetermined criteria for determining the state of the scan data,
    wherein, in the switching, the actuator is deactivated on the basis of whether the alignment is successful and a result obtained by comparing the distance with a pre-stored threshold.

4. The method according to claim 1, wherein the distance includes a depth value of the scan data acquired from the three-dimensional scanner.

5. The method according to claim 4, wherein the depth value is acquired on the basis of a nearest point having a minimum coordinate value with respect to one axis among points of the scan data.

6. The method according to claim 1, wherein the distance is acquired on the basis of an optical path length between a camera embedded in the three-dimensional scanner and the target, and
    the threshold is acquired on the basis of any one of an optical path length between a lens of the camera and an optical path changing member disposed inside one end of the three-dimensional scanner, an optical path length between the lens of the camera and an opening formed at one end of the three-dimensional scanner, and an optical path length between the lens of the camera and a virtual surface formed to be spaced apart by a predetermined offset to an outside of the opening.

7. The method according to claim 1, wherein in the switching, the actuator is selectively deactivated on the basis of a measured value associated with the distance and additionally acquired on the basis of the distance, and
    the measured value includes a scan volume including a nearest point having a minimum coordinate value with respect to one axis among points of the scan data acquired from the three-dimensional scanner.

8. The method according to claim 1, wherein the actuator includes an actuator that vibrates the three-dimensional scanner.

9. The method according to claim 8, wherein the actuator further includes at least one of a light projector that emits light to an outside of the three-dimensional scanner, a speaker that generates sound in order to indicate a state of the scan data acquired from the three-dimensional scanner, and a display unit that displays the state of the scan data on a screen.

10. The method according to claim 1, wherein the threshold is set differently according to a scan depth of the three-dimensional scanner.

11. The method according to claim 1, further comprising:
    detecting a type of the target,
    wherein the switching is selectively performed on the basis of the detected type of the target.

12. A three-dimensional scanning system comprising:
    a three-dimensional scanner configured to scan a target to acquire scan data representing the target;
    at least one actuator configured to generate a feedback according to a state of the scan data;
    a memory; and a processor, wherein the processor is configured to perform, when executing program instructions stored in the memory:
  a control operation to switch an activation state of the actuator on the basis of the scan data;
  an alignment operation to align at least two three-dimensional scan shots acquired by scanning the target;
  a parameter measurement operation to acquire a distance between the three-dimensional scanner and the target; and
  an actuator adjustment operation configured to activate or deactivate the actuator on the basis of the distance acquired by the parameter measurement operation,
wherein the actuator adjustment operation selectively deactivates the actuator when the distance is equal to or less than a pre-stored threshold to prevent collision between the three-dimensional scanner and the target.

13. The three-dimensional scanning system according to claim 12, wherein the actuator is configured to vibrate the three-dimensional scanner.

14. The three-dimensional scanning system according to claim 13, wherein the actuator further includes at least one of a light projector that emits light to an outside of the three-dimensional scanner, a speaker that generates sound in order to indicate a state of the scan data, and a display unit that displays the state of the scan data on a screen.

15. The three-dimensional scanning system according to claim 12, wherein the control operation further comprises:
  a target detection operation to detect a type of the target, wherein the actuator adjustment operation selectively operates on the basis of the detected type of the target.

* * * * *